(12) United States Patent
Patel et al.

(10) Patent No.: US 12,485,766 B2
(45) Date of Patent: Dec. 2, 2025

(54) SYSTEM AND METHOD FOR DYNAMICALLY ADJUSTING COASTING REGENERATION BASED ON ENVIRONMENTAL INFORMATION

(71) Applicant: FCA US LLC, Auburn Hills, MI (US)

(72) Inventors: Bindal Priteshkumar Patel, Canton, MI (US); Alexander N Eskenazi-Gold, Ferndale, MI (US); Joseph Falcon, Saline, MI (US); Michael P Niemiec, Dexter, MI (US)

(73) Assignee: FCA US LLC, Auburn Hills, MI (US)

( * ) Notice: Subject to any disclaimer, the term of this patent is extended or adjusted under 35 U.S.C. 154(b) by 77 days.

(21) Appl. No.: 18/619,427

(22) Filed: Mar. 28, 2024

(65) Prior Publication Data

US 2025/0303874 A1  Oct. 2, 2025

(51) Int. Cl.
*B60L 7/18* (2006.01)
*B60L 15/20* (2006.01)

(52) U.S. Cl.
CPC ............ *B60L 7/18* (2013.01); *B60L 15/2018* (2013.01); *B60L 2240/622* (2013.01); *B60L 2240/642* (2013.01); *B60L 2250/28* (2013.01); *B60L 2260/24* (2013.01)

(58) Field of Classification Search
CPC .. B60L 7/18; B60L 15/2018; B60L 2240/622; B60L 2240/642; B60L 2250/28; B60L 2260/24
USPC ....................................................... 701/1, 22
See application file for complete search history.

(56) References Cited

U.S. PATENT DOCUMENTS

| | | | |
|---|---|---|---|
| 11,065,974 B2 * | 7/2021 | Kodera | B60L 53/68 |
| 11,724,697 B2 * | 8/2023 | Nagata | G08G 1/0145 |
| | | | 701/1 |
| 11,865,947 B2 * | 1/2024 | Ortmann | B60T 1/10 |
| 11,926,331 B2 * | 3/2024 | Books | B60W 50/10 |
| 12,291,188 B2 * | 5/2025 | Gesang | B60K 6/448 |
| 12,344,259 B2 * | 7/2025 | Books | B60W 30/18063 |

(Continued)

OTHER PUBLICATIONS

Liu, W., Qi, H., Liu, X. et al. Evaluation of regenerative braking based on single-pedal control for electric vehicles. Front. Mech. Eng. 15, 166-179 (2020). https://doi.org/10.1007/s11465-019-0546-x (Year: 2020).*

(Continued)

*Primary Examiner* — Jaime Figueroa
(74) *Attorney, Agent, or Firm* — Jeremy J. Klobucar

(57) ABSTRACT

A system that implements a dynamically adjusting coasting regeneration for an electrified vehicle includes an electrified powertrain, first and second sensors and a controller. The electrified powertrain includes an electric motor that provides drive torque to a driveline, the electric motor further providing regenerative braking energy to a battery system during a deceleration event. The first and second sensors sense dynamic, static and pseudo-static artifact data. The controller is configured to receive signals from the first and second sensors; determine first candidate deceleration rates based on the first signal; determine second candidate deceleration rates based on the second signal; select a preferred deceleration rate from the first and second candidate deceleration rates; and provide a torque request to the electrified powertrain indicative of the preferred deceleration rate.

14 Claims, 8 Drawing Sheets

(56) References Cited

U.S. PATENT DOCUMENTS

| | | | | |
|---|---|---|---|---|
| 2011/0246012 | A1* | 10/2011 | McClain | B60L 15/2045 |
| | | | | 701/22 |
| 2015/0203117 | A1* | 7/2015 | Kelly | B60W 40/06 |
| | | | | 701/91 |
| 2016/0031524 | A1* | 2/2016 | Gerhardt | G06F 1/1698 |
| | | | | 701/22 |
| 2016/0052510 | A1* | 2/2016 | Aldrich, III | B60W 30/18063 |
| | | | | 180/65.265 |
| 2016/0059703 | A1* | 3/2016 | Miller | B60W 30/18127 |
| | | | | 701/22 |
| 2019/0001984 | A1* | 1/2019 | Huh | B60W 10/026 |
| 2019/0100209 | A1* | 4/2019 | Plianos | B60K 31/00 |
| 2019/0217847 | A1* | 7/2019 | Hawley | B60W 30/18109 |
| 2019/0315243 | A1* | 10/2019 | Kodera | B60L 7/10 |
| 2021/0394622 | A1* | 12/2021 | Gaither | B60Q 9/00 |
| 2021/0403006 | A1* | 12/2021 | Books | B60W 50/10 |
| 2022/0063417 | A1* | 3/2022 | Lee | B60L 50/16 |
| 2022/0147951 | A1* | 5/2022 | Gaither | H04L 67/025 |
| 2022/0212542 | A1* | 7/2022 | Ortmann | B60T 8/321 |
| 2022/0258754 | A1* | 8/2022 | Mizuno | B60W 30/18109 |
| 2023/0227037 | A1* | 7/2023 | Zhao | B60W 40/105 |
| | | | | 701/1 |
| 2023/0303052 | A1* | 9/2023 | Gesang | B60W 20/15 |
| 2024/0257575 | A1* | 8/2024 | Liu | B60L 1/00 |
| 2025/0002015 | A1* | 1/2025 | Tamura | B60W 30/146 |
| 2025/0229762 | A1* | 7/2025 | Gesang | B60K 6/442 |

OTHER PUBLICATIONS

Min, K.; Sim, G.; Ahn, S.; Sunwoo, M.; Jo, K. Vehicle Deceleration Prediction Model to Reflect Individual Driver Characteristics by Online Parameter Learning for Autonomous Regenerative Braking of Electric Vehicles. Sensors 2019, 19, 4171. https://doi.org/10.3390/s19194171 (Year: 2019).*

Audi Q7 predictive efficiency assistant—praveen moolya channel—https://www.youtube.com/watch?v=ieuikJaU4as; retrieved from the Internet Mar. 26, 2024.

Kona EV—best feature is a hidden gem . . . Smart recuperation—The EV Puzzle channel—https://www.youtube.com/ watch?v=8DPGI8NE8LQ; retrieved from the Internet Mar. 26, 2024.

Mercedes-Benz Technology—B-Class Electric Drive Recuperation—Mercedes-Benz USA channel—https://www.youtube.com/watch?v=tg60oAZSrKQ; retrieved from the Internet Mar. 26, 2024.

* cited by examiner

SYSTEM AND METHOD FOR DYNAMICALLY ADJUSTING COASTING REGENERATION BASED ON ENVIRONMENTAL INFORMATION

FIELD

The present application generally relates to electrified vehicles and, more particularly, to a system and method for managing energy regeneration during vehicle coasting based on environmental information to achieve improved driveability and energy efficiency.

BACKGROUND

An electrified vehicle (hybrid electric, plug-in hybrid electric, range-extended electric, battery electric, etc.) includes at least one battery system and at least one electric motor. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor.

The high voltage battery system generally includes a battery pack assembly. Electrified vehicles can have regenerative braking where energy from vehicle braking is fed back into the high voltage battery system for recharging. In a conventional electrified vehicle, a minimum torque is applied as a function of vehicle velocity. However, such a technique does not consider the surrounding artifacts. Artifacts can include environmental items the vehicle encounters such as, but not limited to, another vehicle, and a road sign that could influence an expected behavior of the vehicle. For example, if an artifact ahead requires the vehicle to slow down more than the vehicle already is coasting during a regenerative braking event, the driver will need to intervene by stepping on the brake pedal. Such a scenario presents an undesirable and inefficient coast down condition. Accordingly, while such braking techniques for electrified vehicles work well for their intended purpose, there exists an opportunity for improvement in the relevant art.

SUMMARY

According to one example aspect of the invention, a system that implements a dynamically adjusting coasting regeneration for an electrified vehicle includes an electrified powertrain, first and second sensors and a controller. The electrified powertrain includes an electric motor that provides drive torque to a driveline, the electric motor further providing regenerative braking energy to a battery system during a deceleration event. The first sensor senses dynamic artifact data and provides a first signal indicative of the dynamic artifact data. The second sensor senses one of static and pseudo-static artifact data and provides a second signal indicative of the static and pseudo-static artifact data. The controller is configured to receive the first and second signals; determine first candidate deceleration rates based on the first signal; determine second candidate deceleration rates based on the second signal; select a preferred deceleration rate from the first and second candidate deceleration rates; and provide a torque request to the electrified powertrain indicative of the preferred deceleration rate.

In some implementations, the first sensor comprises one of a camera and radar that senses a moving object.

In some implementations, the second sensor comprises a global positioning system (GPS) that provides data indicative of a road sign, an intersection, a road slop and road form.

According to another example aspect, the controller is configured to determine the first candidate deceleration rates based on the first signal including: determine an aggressive deceleration rate, a mild deceleration rate and a low deceleration rate; and interpolate an optimized first deceleration rate candidate based on the aggressive, mild and low deceleration rate.

In some implementations, the controller is configured to determine the second candidate deceleration rates based on the second signal including: determine an aggressive deceleration rate, a mild deceleration rate and a low deceleration rate; and interpolate an optimized second deceleration rate candidate based on the aggressive, mild and low deceleration rate.

In some implementations, the controller is configured to select the preferred deceleration rate based on a maximum deceleration rate of the optimized first and second deceleration rate candidates.

In other features the system further comprises a human machine interface, wherein the controller is configured to: provide a coasting guide to a human machine interface indicative of an optimal time to stop engaging an accelerator pedal based on the maximum deceleration rate.

In other implementations, a method for dynamically adjusting coasting regeneration for an electrified vehicle is provided. The electrified vehicle has a first sensor that senses dynamic artifact data and provides a first signal indicative of the dynamic artifact data, and a second sensor that senses one of static and pseudo-static artifact data and provides a second signal indicative of the static and pseudo-static artifact data, the method comprises: receiving, at a controller, the first and second signals; determining, at the controller, first candidate deceleration rates based on the first signal; determining, at the controller, second candidate deceleration rates based on the second signal; selecting a preferred deceleration rate from the first and second candidate deceleration rates; and providing a torque request to the electrified powertrain indicative of the preferred deceleration rate.

In other examples, the method includes sensing, at the first sensor, a moving object, wherein the first sensor comprises one of a camera and radar that senses a moving object.

In additional examples, the method includes sensing, at the second sensor, at least one of a road sign, an intersection, a road slop and road form, wherein the second sensor comprises a global positioning system (GPS).

In additional arrangements determining the first candidate deceleration rates based on the first signal comprises: determining an aggressive deceleration rate, a mild deceleration rate and a low deceleration rate; and interpolating an optimized first deceleration rate candidate based on the aggressive, mild and low deceleration rate.

In additional arrangements determining the second candidate deceleration rates based on the first signal comprises: determining an aggressive deceleration rate, a mild deceleration rate and a low deceleration rate; and interpolating an optimized second deceleration rate candidate based on the aggressive, mild and low deceleration rate.

In other examples, the method includes selecting, at the controller, the preferred deceleration rate based on a maximum deceleration rate of the optimized first and second deceleration rate candidates.

In additional features, the system further includes a human machine interface. The method includes providing, at the controller, a coasting guide to the HMI indicative of an optimal time to stop engaging an accelerator pedal based on the maximum deceleration rate.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, electrified vehicles can have regenerative braking where energy from braking is fed back into the high voltage battery system for recharging. In a conventional electrified vehicle, a minimum torque is applied as a function of vehicle velocity. However, such a technique does not consider the surrounding artifacts. For example, if an artifact ahead requires the vehicle to slow down more than the vehicle already is during coasting, the driver will need to intervene by stepping on the brake pedal. Such a scenario presents an undesirable and inefficient coast down condition.

Accordingly, the present disclosure provides a system and techniques for managing energy regeneration during vehicle coast down based on environmental information to achieve improved driveability and energy efficiency. Vehicle coast down is defined herein as the vehicle decelerating without driver input to the accelerator or brake pedals. In particular, the present disclosure provides a method for determining an optimal coast down or deceleration rate based on artifacts ahead. During a coast down event, regenerative braking concurrently slows the car while providing a recharging power input back into the high-voltage battery system. Example artifacts include a slower vehicle ahead, a traffic sign (stop sign, yield sign) or a speed limit sign.

Figure 1:
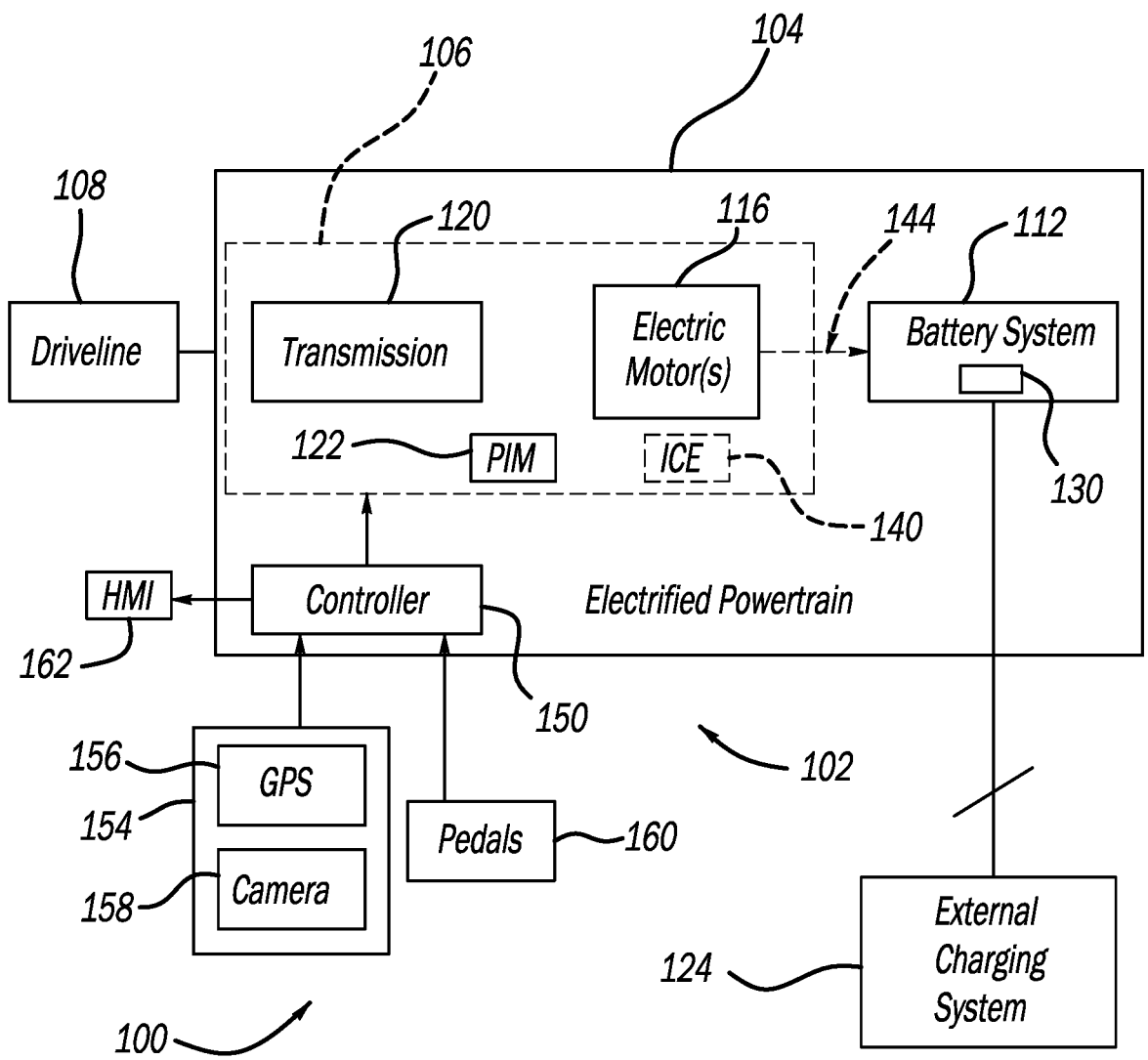
FIG. 1 is a functional block diagram of an electrified vehicle having a regenerative braking system that implements techniques according to the principles of the present application.

Referring now to FIG. 1, a functional block diagram of an example electrified vehicle 100 (also referred to herein as "vehicle 100") having a system 102 that implements a dynamically adjusting coasting regeneration according to the principles of the present application is illustrated. The electrified vehicle 100 includes an electrified powertrain 104 having an electric drive module (EDM) 106 configured to generate and transfer drive torque to a driveline 108 for vehicle propulsion. The EDM 106 generally includes one or more electric drive units or motors 116 (e.g., electric traction motors), an electric drive gearbox assembly or transmission 120, and power electronics including a power inverter module (PIM) 122.

The electric motor 116 is selectively connectable via the PIM 124 to a high voltage battery system 112 for powering the electric motor 116. The battery system 112 is selectively connectable (e.g., by the driver) to an external charging system 124 (also referred to herein as "charger 124") for charging of the battery system 112. The battery system 112 includes at least one battery pack assembly 130. In some examples, described herein, the electrified powertrain 104 can be a hybrid powertrain that additionally includes an internal combustion engine 140. The electrified powertrain 104 includes a regenerative braking system 144 that directs regenerative power from the motor(s) 116 back into the battery system 112 based on a coast down of the EDM 106. The amount of coast down or deceleration rate is determined by the controller 150 according to techniques herein.

A controller 150 can receive inputs from sensors 154 including a global positioning system GPS 156 and a vehicle camera (and/or radar) 158. Pedals 160 including accelerator and brake pedals can provide position inputs to the controller 150. The controller 150 uses the inputs from the sensors 154 and implements techniques to determine a preferred deceleration rate for the vehicle 104. The controller 150 provide various inputs to the EDM 106 to execute the preferred deceleration rate as will be described herein. The controller 150 provides status input of the operating conditions of the vehicle 100 to a human machine interface (such as, for example, a driver cluster and/or infotainment system) 162.

The controller 150 uses the data from the GPS 156 and the camera 158 (artifact data) to predict the deceleration path of the vehicle 100. The deceleration path is determined by the targets set within the information gathered from the GPS 156 and the camera 158. The artifact data can be dynamic, static or pseudo-static. Dynamic artifact data can be a target object front (TOF) and/or another moving vehicle. In examples, the GPS 156 and camera 158 can include or cooperate with a vehicle advanced driver assistance system (ADAS). Static or pseudo-static artifact data can include road signs, intersections, road slope, and road forms. The techniques disclosed herein will arbitrate between all artifact data.

In examples, the camera 158 provides the distance to the nearest vehicle ahead and its current speed. The data provided by the GPS 156 provides the distance to the closest upcoming traffic signs in the path of the vehicle 100. The path can be set by the driver through the GPS 156 or information from the most probable driver path (current road) ahead. In prior art examples, there is a minimum deceleration torque applied when the vehicle is in coast down. This is the coasting feel of the vehicle 100 and is almost exclusively dependent on the current velocity of the vehicle. The techniques of the instant disclosure manipulates the minimum torque applied during coast down to ensure that the vehicle 100 gets to the target distance and target speed based on the different artifacts ahead.

Figure 2:
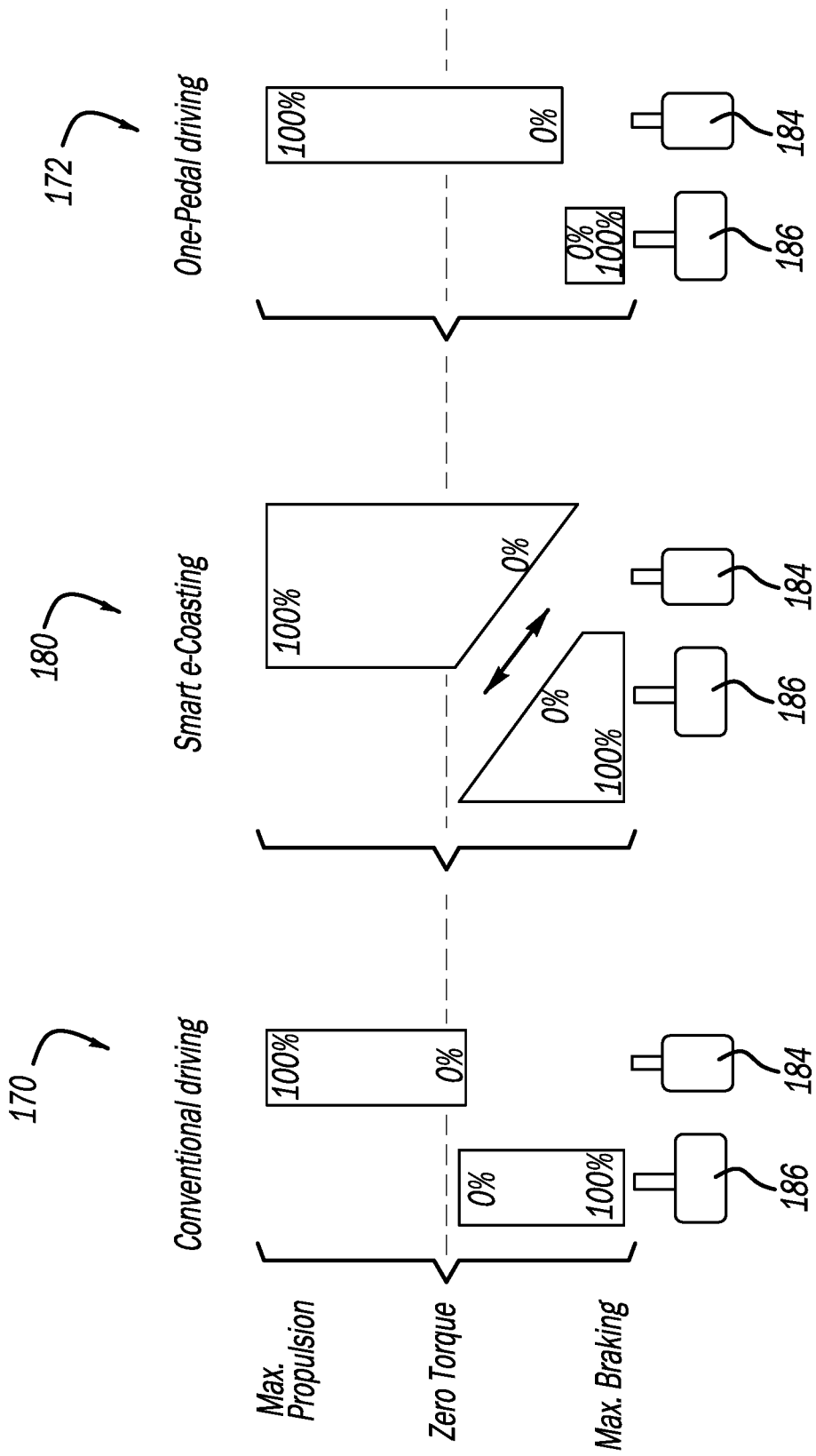
FIG. 2 is a schematic representation of braking techniques including conventional driving and one-pedal driving according to known prior art techniques compared to a smart e-Coasting technique according to the principles of the present application.

With additional reference now to FIG. 2, a schematic representation of braking techniques including conventional driving 170 and one-pedal driving 172 according to known prior art techniques are illustrated. An e-Coasting technique 180 implemented according to the principles of the present application is also shown. Conventional driving 170 essentially includes propulsion input from an accelerator pedal 184 and braking inputs from a brake pedal 186. Negative torque input is almost entirely generated based on input from the brake pedal 186. Similarly, one-pedal driving 172 is a known technique that includes a negative torque input that is partially based on a position of the accelerator pedal 184. In other words, if the accelerator pedal 184 is not providing a positive torque request, it can be alternatively providing a negative torque request. As such, during one-pedal driving acceleration and braking are accomplished solely by the accelerator pedal 184. The e-Coasting technique 180 of the present disclosure provides an intelligent modulation of regenerative torque between the conventional driving and one-pedal techniques 170, 172 based on the environment around the vehicle 100 to provide an improved efficiency based on sensed artifacts. In examples, the e-Coasting technique 180 is a driver selectable mode that can be entered such as through the HMI 162.

Figure 3:
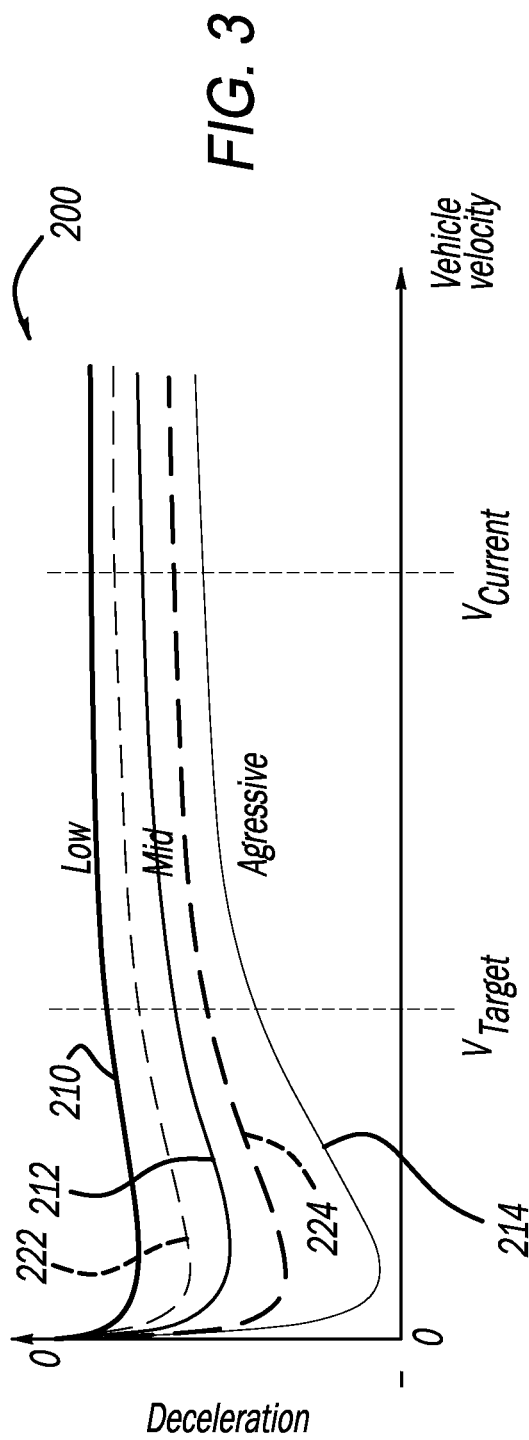
FIG. 3 is plot of vehicle velocity versus deceleration showing example real time interpolated deceleration curves provided by the smart e-Coasting techniques of FIG. 2 according to the principles of the present application.

FIG. 3 is a plot 200 of vehicle velocity versus deceleration showing example real time interpolated deceleration curves provided by the smart e-Coasting techniques 180 of FIG. 2 according to the principles of the present application. The techniques herein can provide a calibrated low, middle and aggressive curve 210, 212 and 214. Further, the controller 150 determines a real time optimal interpolated first deceleration curve 222 between the low and middle curves 210 and 212 as well as a real time optimal interpolated second deceleration curve 224 between the middle and aggressive curves 212 and 214. In examples, the e-Coasting technique 180 can have a limit to aggressiveness such as, but not limited to, −0.25 G. In other words, the e-Coasting technique 180 is not meant to replace an emergency braking condition in which a driver must intervene by engaging the brake pedal 186. The e-Coasting technique 180 will actively modulate between each of the curves based on artifact data.

Figure 4:
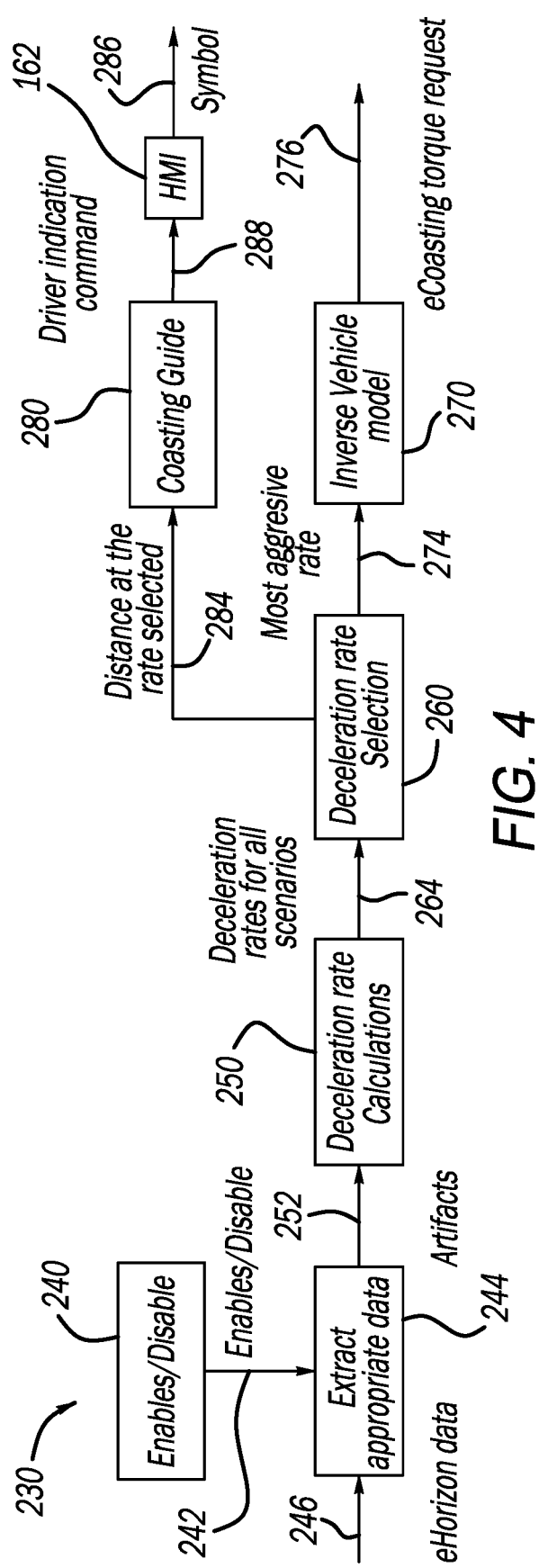
FIG. 4 is an exemplary logic flow diagram showing steps implemented by the e-Coasting technique according to the principles of the present application.

Turning now to FIG. 4, an exemplary logic flow diagram 230 implemented by the controller 150 showing steps implemented by the e-Coasting technique according to the principles of the present application is shown. At 240, enables, disable inputs 242 are received at an extract data module 244. The enables, disable inputs 242 can correspond to driver inputs at the HMI 162 indicating a desire to enter or exit the e-Coasting feature. Additionally, a disable input 242 can correspond to any faults at the sensors 154.

Sensor (artifact) data such as eHorizon data 246 from the sensors 154 is also received by the extract data module 244. At 250, control determines deceleration rate calculations based on artifact inputs 252 to determine an optimal deceleration rate. At 260 control determines a deceleration rate selection based on deceleration rate inputs 264 from all scenarios (all artifact data).

At 270 control implements an inverse vehicle model based on the most aggressive rate 274 of all the perspective rates calculated at 250. The inverse vehicle model 270 provides an e-Coasting torque request to the EDM 106. In other words, after the deceleration rate has been selected at 260, the deceleration rate is converted into a corresponding torque value that is executed by the electrified powertrain 104 to achieve the deceleration rate target. Control also determines a coasting guide 280 based on a distance determined at the rate selected 284. The HMI 162 provides an output or symbol 286 based on a driver indication command 288 generated by the coasting guide 280. In examples, the coasting guide 280 can provide the driver, such as at the HMI 162, an optimal time to take their foot off of the accelerator pedal 184 so that the e-Coasting techniques can intelligently modulate deceleration based on the artifacts.

Figure 5:
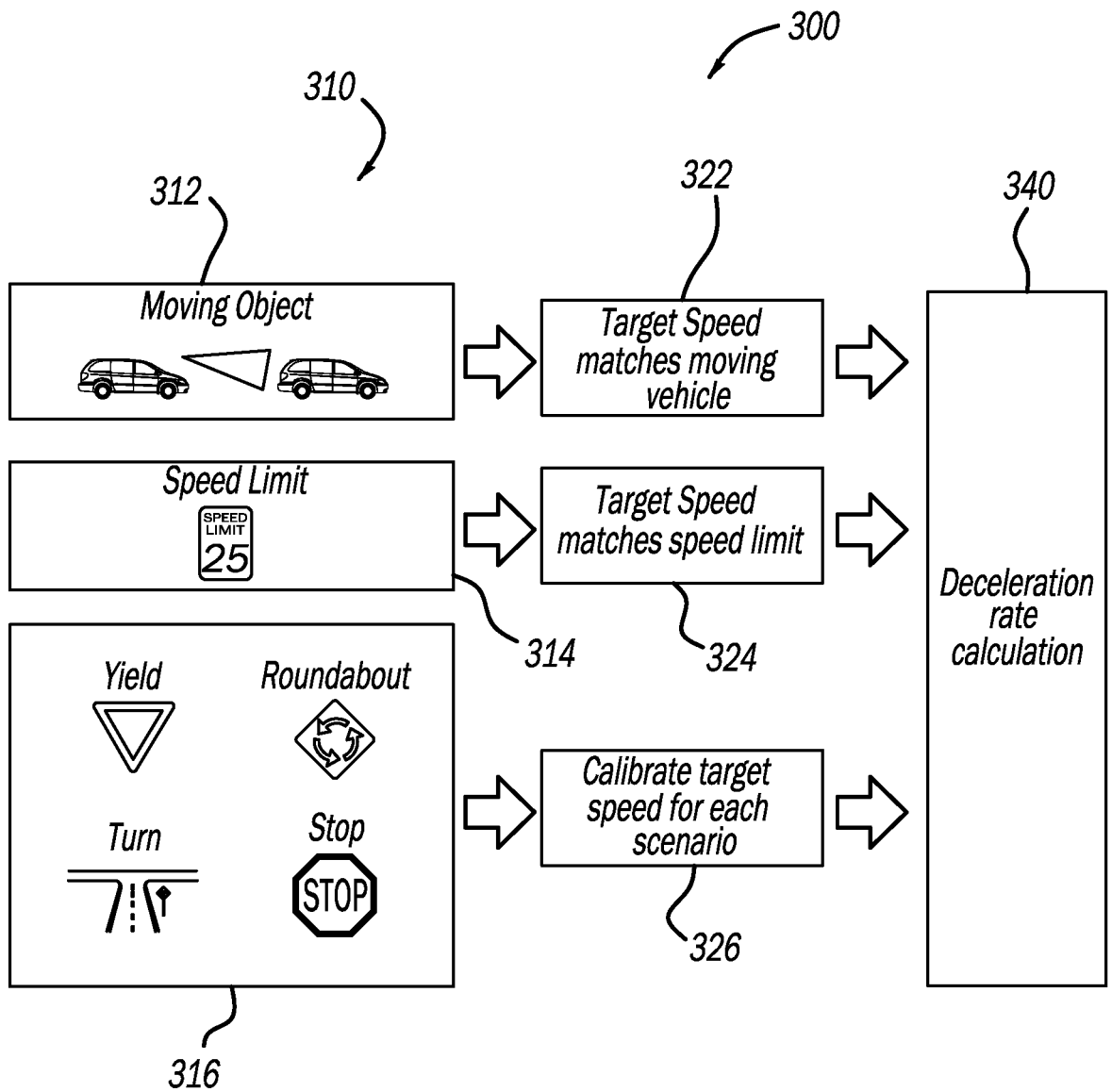
FIG. 5 is diagram illustrating exemplary artifacts including a target object (such as a moving vehicle), a speed limit sign, and a traffic sign, used to determine a deceleration rate according to the principles of the present application.

With additional reference to FIG. 5, a diagram 300 illustrating exemplary artifacts, collectively identified at 310 and including a target object (such as a moving vehicle) 312, a speed limit sign 314, and a traffic sign 316, used to determine a deceleration rate according to the principles of the present application is shown. Control determines a target speed that matches the moving object 312 at 322. Control determines a target speed that matches the speed limit 314 at 324. Control determines a calibrated target speed for each scenario of the traffic signs 316 at 326. Control determines a deceleration rate calculation 340 based on all of the inputs 322, 324 and 326. As will become appreciated herein, control honors the artifact 310 that requires the most aggressive deceleration.

Figure 6:
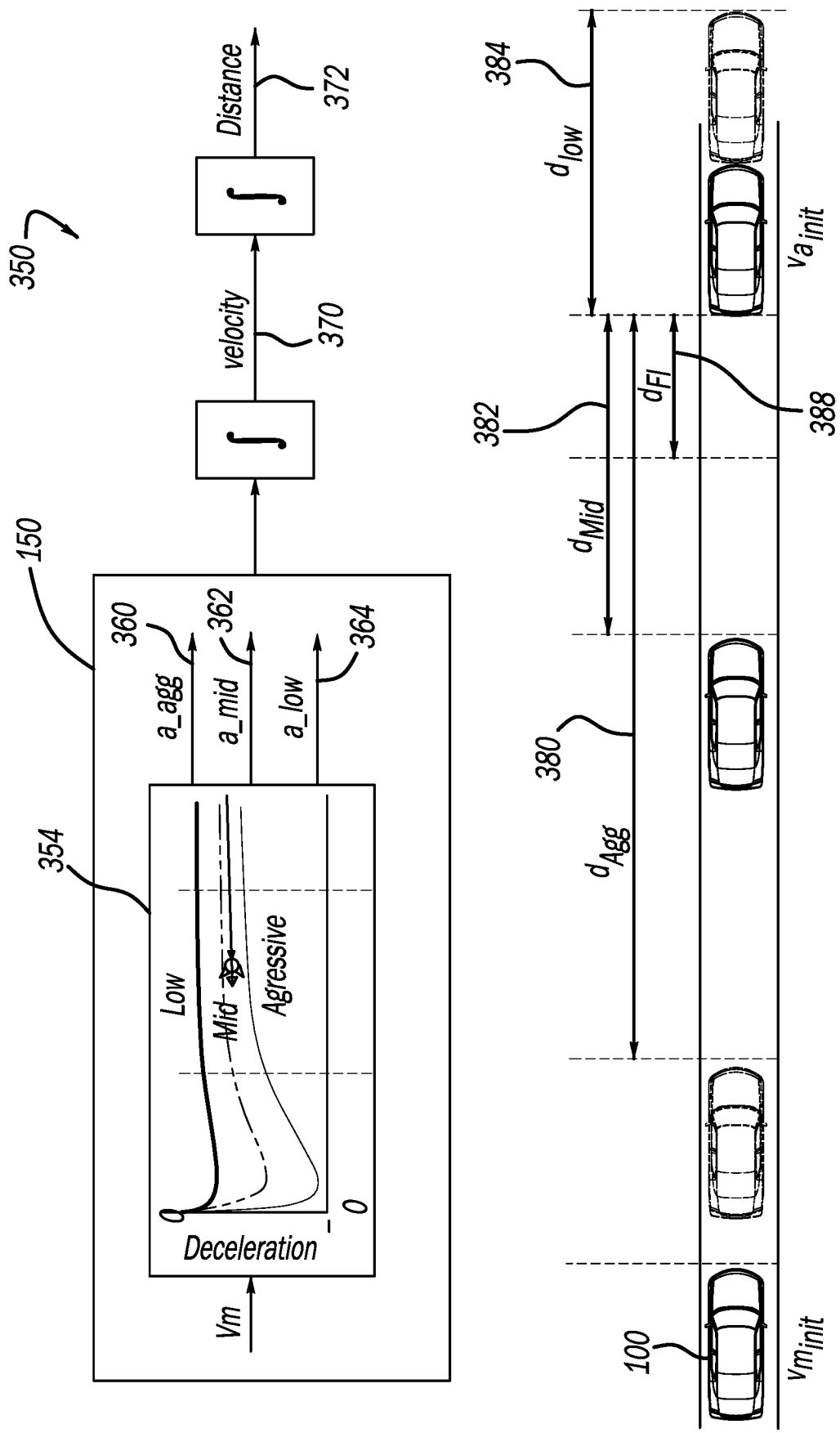
FIG. 6 is an illustration showing techniques for determining the distance at which the vehicle will reach the desired velocity according to the principals of the present application.

Turning now to FIG. 6, an illustration 350 showing techniques for determining the distance at which the vehicle 100 will reach the desired velocity according to the principals of the present application is shown. As explained above with respect to FIG. 3, the controller 150 determines real time interpolated deceleration curves 354 provided by the smart e-Coasting techniques. An aggressive, middle and low output 360, 362 and 364 are determined. In generally, the controller 150 can integrate the accelerations to determine a velocity 370 and integrate the velocity 370 to determine a distance 372. The distance 372 is represented as an aggressive distance 380 (wherein the vehicle 100 would stop furthest back from the vehicle ahead), a middle distance 382 (corresponding to a mild coast down wherein the vehicle 100 would stop closer to the vehicle ahead) and a low distance 384 (wherein the vehicle 100 would stop after the vehicle ahead). The goal is to reach the target velocity at the target distance. A distance 388 represents an optimal coast down having a preferred distance from the followed vehicle. In other words, the vehicle 100 slows down to the target distance and velocity simultaneously. This is achieved by interpolating the distances between the aggressive and mild coast down to select an optimal deceleration rate.

Figure 7:
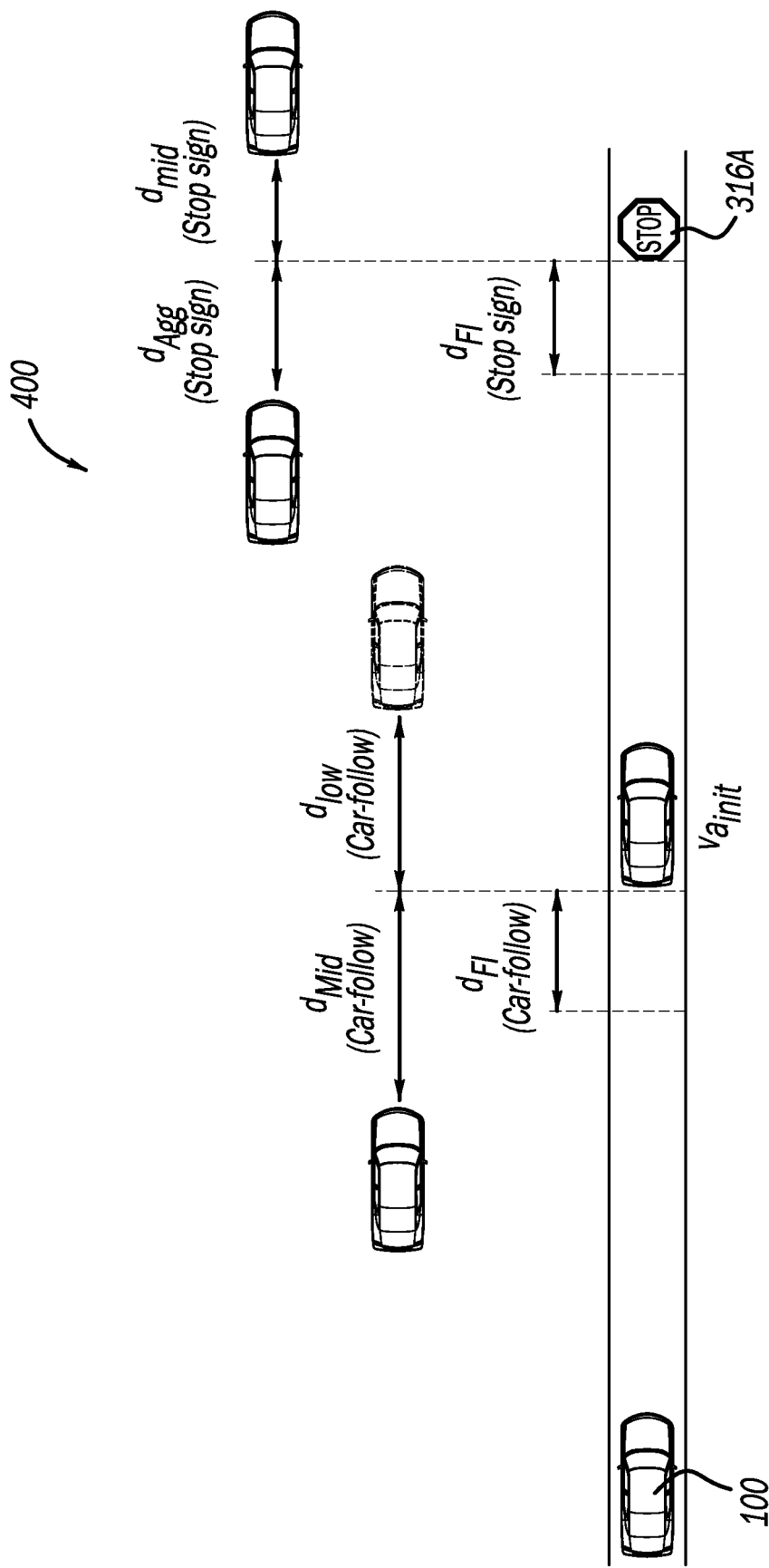
FIG. 7 is an illustration showing techniques for determining the final deceleration rate for the car follower scenario shown in FIG. 6.

FIG. 7 is an illustration 400 showing techniques for determining the final deceleration rate for the car follower scenario shown in FIG. 6 (based on the moving object artifact 312, FIG. 5). As can be appreciated, the same calculations will be carried out for the vehicle stop scenario (speed limit artifact 314, FIG. 5) and the speed sign scenario (road sign artifact 316, FIG. 5). The controller 150 determines the optimal deceleration rate according to the rate with the highest magnitude. In this regard, the controller 150 requests the most aggressive deceleration rate. By way of example, even of the stop sign 316A is after a vehicle, if it demands a more aggressive deceleration rate it will control.

Figure 8:
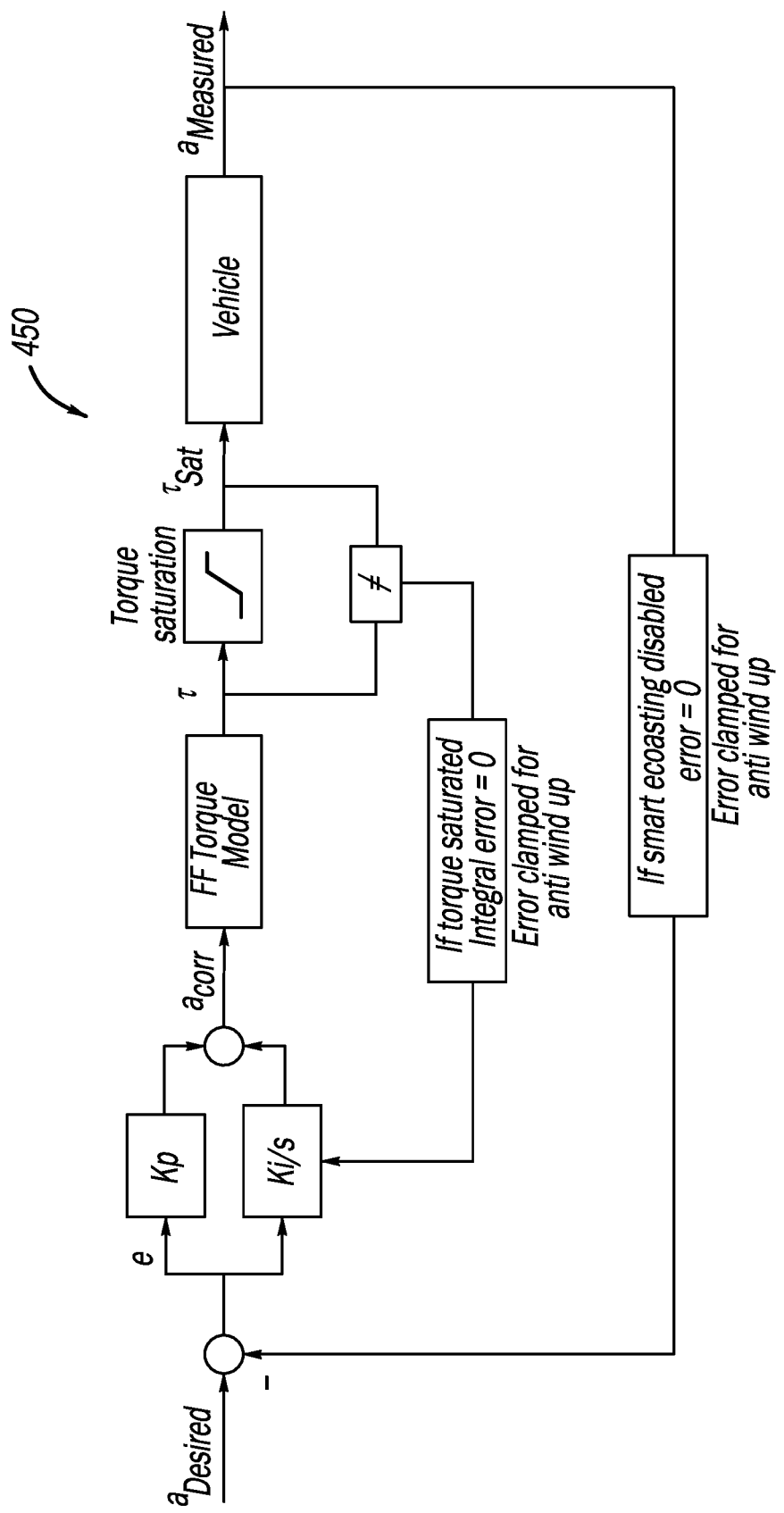
FIG. 8 is an exemplary logic flow diagram of a controller that implements the techniques of the present disclosure.

FIG. 8 is an exemplary logic flow diagram 450 including an inverse torque model that the controller 150 implements according to techniques of the present disclosure. Control assures it selects the correct acceleration target based on the feedback it is receiving. Once the deceleration rate target has been calculated, a PI controller uses the feedback from the measured acceleration to correct the torque (regenerative braking torque) that the controller 150 is outputting (requesting at the electrified powertrain 104). In this regard, any error between desired and measured values is mitigated.

Figure 9:
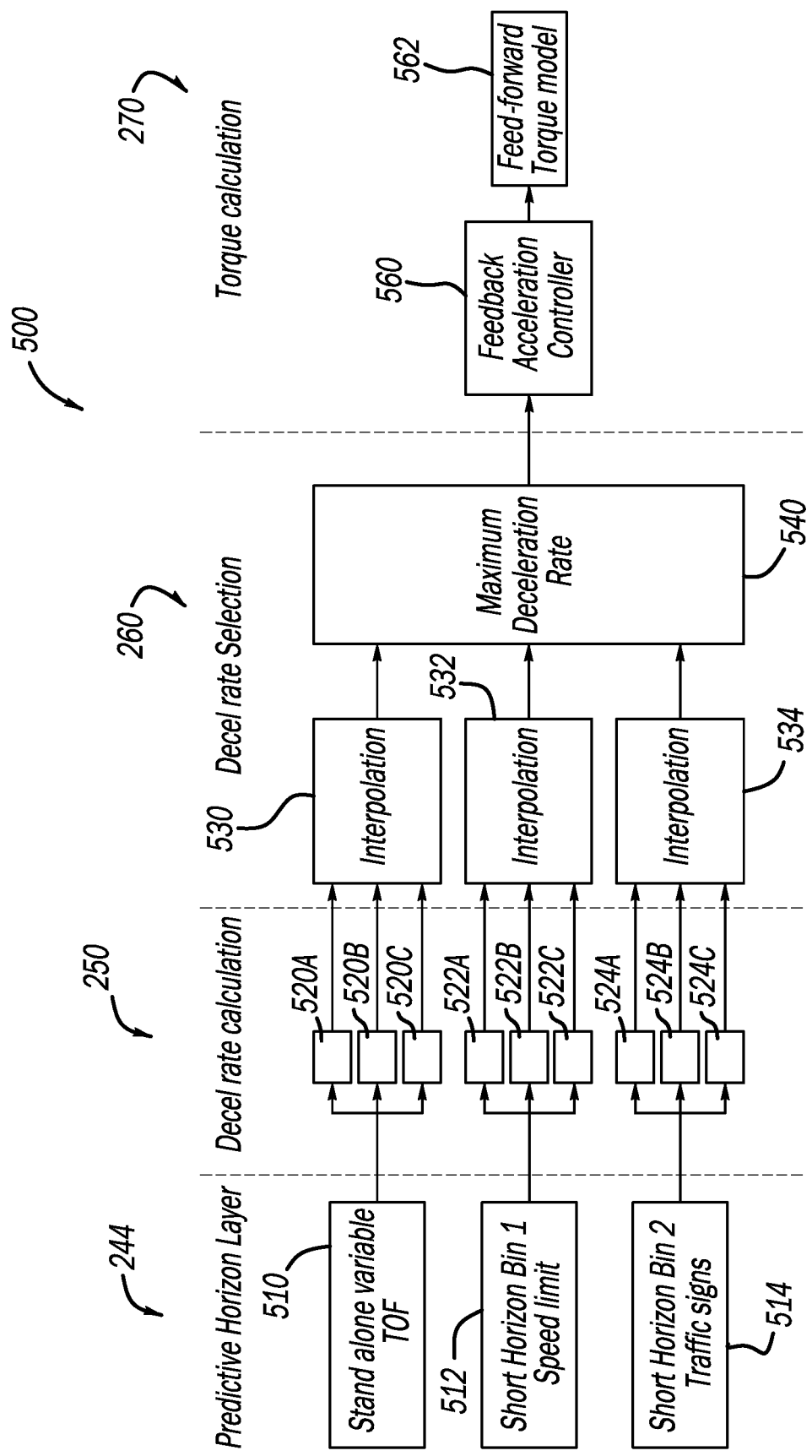
FIG. 9 is an exemplary logic flow diagram illustrating steps for determining torque calculation according to techniques of the present disclosure.

FIG. 9 is an exemplary logic flow diagram 500 illustrating steps implemented by the controller 150 for determining torque calculation according to techniques of the present disclosure. The logic flow diagram 500 is an overview of the techniques shown in FIG. 4. In particular, the controller 150 extracts appropriate data at 244, determines deceleration rate calculations at 250, determines deceleration rate selection at 260 and determines a torque calculation at 270. At 244, control determines a stand alone variable TOF 510, a short horizon bin 1 speed limit 512 and a short horizon bin 2 traffic signs 514. Deceleration rate calculations 520A, 520B, 520C, 522A, 522B, 522C and 524A, 524B, 524C are calculated (most, middle, least aggressive). A maximum deceleration rate 540 is determined based on Interpolations 530, 532 and 534. The interpolations 530, 532 and 534 select the appropriate mixture of the deceleration rate calculations 520A, 520B, 520C, 522A, 522B, 522C and 524A, 524B, 524C. For example, the interpolation 530 does not necessarily select one of the 520A, 520B and 520C. Instead, the interpolation 530 considers the available distance candidates from the low, middle and aggressive curves. If a distance resulting from the low curve results in a position beyond the other vehicle, that distance is discarded as an option. However, if the middle curve is followed, a resulting distance is too far behind the other vehicle. The interpolation 530 interpolates between the low (vehicle 100 doesn't stop soon enough) and middle (vehicle 100 stops too soon) to attain an optimized, preferred distance. Interpolations 532 and 534 operate similarly.

Again, whichever artifact corresponding to layers 510, 512, 514 having the most aggressive deceleration will be honored at 540. The controller 150 uses this deceleration request as the set point for the deceleration path in the vehicle coast down. The deceleration request is converted to wheel torque by incorporating a feedforward road load model and a feedback PID controller (FIG. 8). The vehicle 100 will have a module minimum torque request during a coast down event such that the target velocity is achieved at the target distance. A feedback acceleration controller 560 and feed forward torque model 562 are determined at the torque calculation 270. Regenerative braking is optimized in such a way to avoid additional propulsion or friction braking once coast down has started. All negative torque request is implemented as regenerative braking.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A system that implements a dynamically adjusting coasting regeneration for an electrified vehicle, the system comprising:
   an electrified powertrain including an electric motor that provides drive torque to a driveline, the electric motor further providing regenerative braking energy to a battery system during a deceleration event;
   a first sensor that senses dynamic artifact data and provides a first signal indicative of the dynamic artifact data;
   a second sensor that senses one of static and pseudo-static artifact data and provides a second signal indicative of the static and pseudo-static artifact data; and
   a controller configured to:
      receive the first and second signals;
      determine first candidate deceleration rates based on the first signal;
      determine second candidate deceleration rates based on the second signal;
      select a preferred deceleration rate from the first and second candidate deceleration rates; and
      provide a torque request to the electrified powertrain indicative of the preferred deceleration rate.

2. The system of claim 1, wherein the first sensor comprises one of a camera and radar that senses a moving object.

3. The system of claim 1, wherein the second sensor comprises a global positioning system (GPS) that provides data indicative of a road sign, an intersection, a road slop and road form.

4. The system of claim 1, wherein the controller is configured to determine the first candidate deceleration rates based on the first signal including:
   determine an aggressive deceleration rate, a mild deceleration rate and a low deceleration rate; and
   interpolate an optimized first deceleration rate candidate based on the aggressive, mild and low deceleration rate.

5. The system of claim 4, wherein the controller is configured to determine the second candidate deceleration rates based on the second signal including:
   determine an aggressive deceleration rate, a mild deceleration rate and a low deceleration rate; and
   interpolate an optimized second deceleration rate candidate based on the aggressive, mild and low deceleration rate.

6. The system of claim 5, wherein the controller is configured to select the preferred deceleration rate based on a maximum deceleration rate of the optimized first and second deceleration rate candidates.

7. The system of claim 6, wherein the system further comprises a human machine interface (HMI), wherein the controller is configured to:
   provide a coasting guide to the HMI indicative of an optimal time to stop engaging an accelerator pedal based on the maximum deceleration rate.

8. A method for dynamically adjusting coasting regeneration for an electrified vehicle, the electrified vehicle having a first sensor that senses dynamic artifact data and provides a first signal indicative of the dynamic artifact data, a second sensor that senses one of static and pseudo-static artifact data and provides a second signal indicative of the static and pseudo-static artifact data, the method comprising:
- receiving, at a controller, the first and second signals;
- determining, at the controller, first candidate deceleration rates based on the first signal;
- determining, at the controller, second candidate deceleration rates based on the second signal;
- selecting a preferred deceleration rate from the first and second candidate deceleration rates; and
- providing a torque request to the electrified powertrain indicative of the preferred deceleration rate.

9. The method of claim 8, further comprising:
- sensing, at the first sensor, a moving object, wherein the first sensor comprises one of a camera and radar that senses a moving object.

10. The method of claim 8, further comprising:
- sensing, at the second sensor, at least one of a road sign, an intersection, a road slop and road form, wherein the second sensor comprises a global positioning system (GPS).

11. The method of claim 8, wherein determining the first candidate deceleration rates based on the first signal comprises:
- determining an aggressive deceleration rate, a mild deceleration rate and a low deceleration rate; and
- interpolating an optimized first deceleration rate candidate based on the aggressive, mild and low deceleration rate.

12. The method of claim 11, wherein determining the second candidate deceleration rates based on the second signal comprises:
- determining an aggressive deceleration rate, a mild deceleration rate and a low deceleration rate; and
- interpolating an optimized second deceleration rate candidate based on the aggressive, mild and low deceleration rate.

13. The method of claim 12, further comprising:
- selecting, at the controller, the preferred deceleration rate based on a maximum deceleration rate of the optimized first and second deceleration rate candidates.

14. The method of claim 13, wherein the system further comprises a human machine interface (HMI), the method further comprising:
- providing, at the controller, a coasting guide to the HMI indicative of an optimal time to stop engaging an accelerator pedal based on the maximum deceleration rate.

* * * * *